（12) United States Patent
Cornic et al.

(10) Patent No.: US 8,432,307 B2
(45) Date of Patent: Apr. 30, 2013

(54) AGILE-BEAM RADAR NOTABLY FOR THE OBSTACLE 'SENSE AND AVOID' FUNCTION

(75) Inventors: Pascal Cornic, Guilers (FR); Patrick Le Bihan, Lannilis (FR); Stéphane Kemkemian, Paris (FR)

(73) Assignee: Thales, Neuilly sur Seine (FR)

( * ) Notice: Subject to any disclaimer, the term of this patent is extended or adjusted under 35 U.S.C. 154(b) by 196 days.

(21) Appl. No.: 12/881,965

(22) Filed: Sep. 14, 2010

(65) Prior Publication Data

US 2011/0221625 A1  Sep. 15, 2011

(30) Foreign Application Priority Data

Sep. 15, 2009  (FR) ..................................... 09 04395

(51) Int. Cl.
*G01S 13/00*  (2006.01)
(52) U.S. Cl.
USPC ............................. 342/29; 342/118; 342/134
(58) Field of Classification Search .................. 342/107, 342/113, 123, 133, 139–142, 146–147, 157–158
See application file for complete search history.

(56) References Cited

U.S. PATENT DOCUMENTS

| | | | |
|---|---|---|---|
| 3,364,484 A | | 1/1968 | Best |
| 4,336,540 A | * | 6/1982 | Goodwin et al. ............. 342/157 |
| 5,103,233 A | * | 4/1992 | Gallagher et al. ............. 342/408 |
| 5,442,364 A | * | 8/1995 | Lee et al. ...................... 342/372 |
| 5,598,163 A | | 1/1997 | Cornic et al. |
| 7,737,879 B2 | * | 6/2010 | Tietjen et al. ................... 342/59 |
| 7,834,803 B2 | * | 11/2010 | Weinstein ........................ 342/70 |
| 8,299,958 B2 | * | 10/2012 | Kemkemian et al. ......... 342/107 |
| 2007/0013577 A1 | * | 1/2007 | Schnitzer et al. ............... 342/90 |
| 2007/0182619 A1 | * | 8/2007 | Honda et al. .................... 342/80 |

(Continued)

FOREIGN PATENT DOCUMENTS

| | | |
|---|---|---|
| EP | 0 568 427 A1 | 11/1993 |
| FR | 2 741 453 A1 | 5/1997 |
| FR | 2 913 774 A1 | 9/2008 |
| GB | 2 228 387 A | 8/1990 |

OTHER PUBLICATIONS

Rajeswari, K.R.; Gangatharan, N.; Morris, G.E.; Rao, G.S.V.R.; Kumari, M.U.; Swamy, G.N.; , "Sidelobe reduction techniques for range-resolution radar," Communication Systems, 2002. ICCS 2002. The 8th International Conference on , vol. 2, No., pp. 784-789 vol. 2, Nov. 25-28, 2002.*
Francois Le Chevalier, "Space-Time Transmission and Coding for Airborne Radars", Radar Science and Technology, Dec. 1, 2008, pp. 411-421, vol. 6, No. 6, XP009130674.

*Primary Examiner* — John B. Sotomayor
*Assistant Examiner* — Marcus Windrich
(74) *Attorney, Agent, or Firm* — Baker Hostetler LLP

(57) ABSTRACT

A radar device includes an antenna having at least two linear arrays of radiating elements being orthogonal to one another, a first array being used to focus a transmission beam in a first plane and a second beam being used to focus a reception beam in a second plane, orthogonal to the first plane. The focussing of the beam is obtained in the first plane by colored emission followed by a reception beam formation by computation, and in that the focussing of the beam is obtained in the second plane using reception beam formation by computation. The colored emission is carried out by combining antenna transmission sub-arrays in such a manner as to form a sum channel and a difference on reception channel according to the monopulse technique.

12 Claims, 5 Drawing Sheets

U.S. PATENT DOCUMENTS

2008/0204306 A1* 8/2008 Shirakawa .................. 342/118
2010/0085237 A1   4/2010 Cornic et al.
2011/0248881 A1* 10/2011 Kemkemian et al. ......... 342/156
2012/0081247 A1*  4/2012 Kemkemian et al. .......... 342/29

* cited by examiner

AGILE-BEAM RADAR NOTABLY FOR THE OBSTACLE 'SENSE AND AVOID' FUNCTION

CROSS-REFERENCE TO RELATED APPLICATION

This application claims priority to foreign French patent application No. FR 09 04395, filed on Sep. 15, 2009, the disclosure of which is incorporated by reference in its entirety.

FIELD OF THE INVENTION

The present invention relates to an agile-beam radar system. It is notably applicable for the obstacle detection and avoidance function, referred to as 'sense and avoid'.

BACKGROUND OF THE INVENTION

The development of a non-cooperative airborne obstacle detection radar function for aircraft, in particular for drones, is essential in order to enable the insertion of autopiloted aircraft into unsegregated airspace. It participates in the obstacle detection and avoidance function known under the term "Sense and Avoid".

Such a radar system must be capable of a very wide field of observation, typically +/−110° in azimuth and +/−15° in elevation, and must be capable of scanning the airspace in a very short time, in view of the time needed in order to engage an avoidance manoeuvre in the case of a collision risk. These characteristics correspond approximately to the environment observational capacity of a "human" pilot.

For reasons of total penetration range in rainy weather, of availability of low-cost microwave components, and of ease of integration onto the carrier, such a radar system advantageously uses X band.

For such an application, it is advantageous to use one or more wide-field transmission antennas, and to simultaneously form multiple reception beams within the illuminated field. This solution is conventionally implemented by means of antenna arrays whose radiation patterns must have a sufficient directivity to localize the targets with a high enough precision. This directivity is typically better than 10° in both planes. In addition, the antenna radiation patterns must have the lowest possible levels of secondary lobes in order to reject the ground clutter, in particular during low-altitude flight phases. Furthermore, the surface area of the antenna must be large enough to cover the required total range with a reasonable power level which is, generally speaking, of the order of 20 watts. In addition to these technical constraints, the radar system must be able to be installed on various types of aircraft, and the constraints on volume for the electronics and surface area available for the antenna are very tight. Lastly, the overall cost of the electronics must be minimized.

The challenge is thus to define a radar antenna architecture and an associated processing system allowing high-quality radiation patterns to be obtained, while at the same time minimizing the volume of the electronics and the antenna surface area to be installed.

The primary objectives to be taken into account in the definition of such a radar system are notably the following:
  Obtain a wide instantaneous coverage of the field of observation by means of one or more wide transmission beams, in association with the formation of reception beams;
  Facilitate the integration by minimizing the surface area of the antenna while at the same time maintaining the required range and keeping to reasonable transmission power levels, for example within the 20 watt class;
  Ensure a directivity that is sufficient for separating targets and for reducing the ground clutter returns in the main lobe, for example within the 10° class or less;
  Minimize the secondary lobe levels in order to limit ground returns as far as possible;
  Minimize the number of transmission and reception channels in order to reduce the cost of the device;
  Choose a flexible architecture capable of supporting modifications to the specifications.

In cases where the same types of problems and issues are posed, electronic scanning or transmission beam switching techniques associated with reception beam formation by computation are generally implemented, by using array antennas, active or otherwise. Unfortunately, in order to guarantee an unambiguous spatial sampling over a wide area, the elementary sources forming the array must be separated from one another by a fraction of a wavelength. Considering an antenna with a 10° aperture in both planes, the number of channels is thus of the order of 100, which cannot be envisaged for an application of the "sense and avoid" type, for reasons of cost and complexity. Furthermore, such a solution would commandeer a continuous installation surface area of around 20 cm by 20 cm per antenna panel, which is not compatible with all carriers, especially as two panels are needed in order to cover the entire azimuthal field over an angular range of +/−110°.

It would be possible to use open hole arrays, but in view of the demands on the level of the antenna secondary lobes, the number of channels would remain very high, typically of the order of 50. Furthermore, this solution would not allow an easier integration onto the carrier, given that the continuous surface area taken up remains unchanged for the same antenna aperture.

Alternatively, it would be possible to use a multiple input/output access antenna array, of the MIMO type, associated with a colored emission. The principles of colored emission are notably described in the article by Francois Le Chevalier: "Space-time transmission and coding for airborne radars" published in Radar Science and Technology, Volume 6, December 2008. However, this type of device presents the following drawbacks:
  Since the transmission array simultaneously covers a wide range in elevation, it is necessary to supply each of the sources of the transmission array with a coded signal, where the codes need to all be orthogonal to one another. The electronics needed and the associated processing are therefore complex, and become more so as the size of the array increases;
  The implementation of these codes is carried out to the detriment of the distance resolution, which is a problem in particular when the detection of the target has to be carried out in contrast with respect to the ground clutter.

SUMMARY OF THE INVENTION

The invention notably enables a radar system to be produced that takes into account all or a part of the aforementioned primary objectives. For this purpose, the subject of the invention is a radar device comprising an antenna comprising at least two linear arrays of radiating elements being orthogonal to one another, a first array being used to focus a transmission beam in a first plane and a second beam being used to focus a reception beam in a second plane, orthogonal to the first plane.

The focussing of the beam is for example obtained in the first plane by colored emission followed by a reception beam formation by computation, and the focussing of the beam is obtained in the second plane using reception beam formation by computation.

In one particular embodiment, the colored emission is carried out by combining antenna transmission sub-arrays in such a manner as to form a sum channel and a difference channel on reception according to the monopulse technique.

The first plane is for example the elevation plane and the second plane is the azimuthal plane.

In this case, since the first array being substantially vertical, a first sub-array is for example formed from the upper part of this array and a second sub-array is formed from its lower part.

The colored emission can be carried out by means of a Barker code. In this case, a direct Barker code is for example emitted on the first sub-array and the same code inverted is emitted on the second sub-array.

In another possible embodiment, the colored emission is carried out by means of a frequency code F1, F2. The frequency coding consists for example in emitting the transmission signal at a given frequency F1 on the first sub-array and in emitting the transmission signal at a different frequency F2, these two frequencies being orthogonal over the duration of the transmission pulse.

Advantageously, a radar device according to the invention comprises at least one additional array of radiating elements for focussing a transmission beam substantially parallel to the first array, the various transmission beams having different directions, each beam being dedicated to one part of the angular range to be covered.

The second array comprises for example at least two lines of radiating elements forming an interferometer being ambiguous in elevation, the ambiguity being removed by focussing the beam in the direction targeted.

The focussing can be obtained in one plane by electronic scanning on transmission and in the other plane using beam formation by computation on reception.

The transmission and reception part is for example constructed as a multilayer printed circuit, the radiating elements being etched onto one of the faces of the circuit, the active components being mounted on the other face, the interconnection and distribution elements being formed on the internal layers of the printed circuit.

BRIEF DESCRIPTION OF THE DRAWINGS

Other features and advantages of the invention will become apparent with the aid of the description that follows, presented with reference to appended drawings which show.

DETAILED DESCRIPTION

Figure 1:
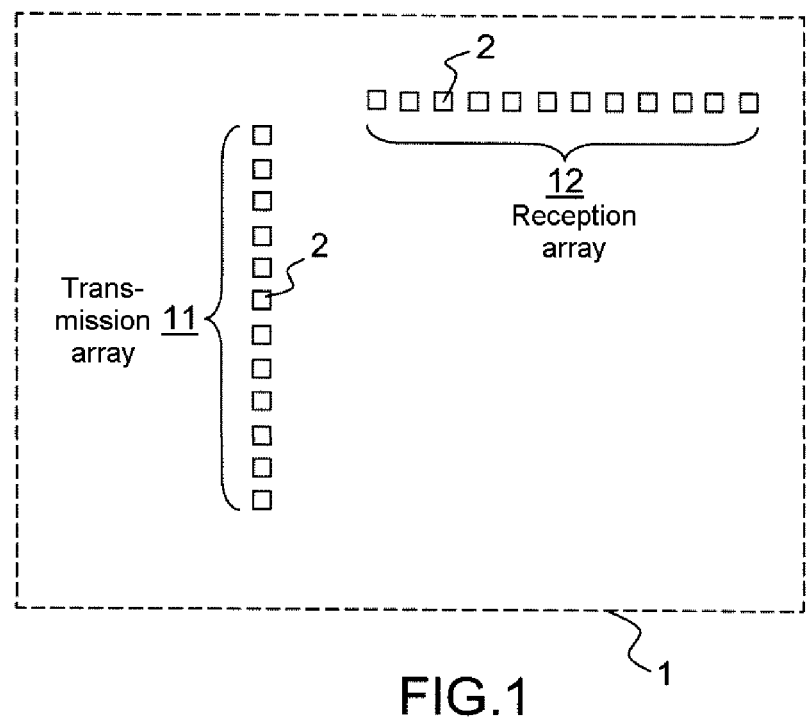
FIG. 1, the principle of construction of an antenna used in a radar system according to the invention.

FIG. 1 shows the principle of construction of an antenna 1 used in a radar system according to the invention. This antenna comprises two arrays 11, 12 of radiating elements 2, each forming an elementary transmission source and an elementary reception receiver. They are fabricated using the same technology and are, for example, metal "patches".

These two arrays 11, 12 are linear and orthogonal to one another. One array 11 is used for the transmission and the other array 12 is used for the reception. More particularly, the first array 11 is used to focus the antenna beam in one plane on transmission, using beam formation by computation. The second array 12 is used to focus the reception antenna beam in the plane orthogonal to the preceding plane, using beam formation by computation.

In view of the required respective angular ranges of coverage, +/−110° in azimuth and +/−15° in elevation, at least one vertical array is used for transmission and at least one horizontal array is used for reception. In its simplest form, such as shown in FIG. 1, the array antenna 1 therefore comprises a column array 11 for the transmission, disposed vertically, and a row array 12 for the reception, disposed horizontally. The arrays 11, 12 may be separated from one another by any distance as long as the directions targeted by the radiating elements 2 are close and their radiation patterns similar.

Advantageously, the second array 12 comprises at least two rows of radiating elements 2 forming an interferometer that is ambiguous in elevation, the ambiguity being removed by focussing the transmission beam in the desired targeted direction.

The antenna arrays 11, 12 may advantageously be in the form of a printed circuit thus allowing a low-cost fabrication.

Figure 2:
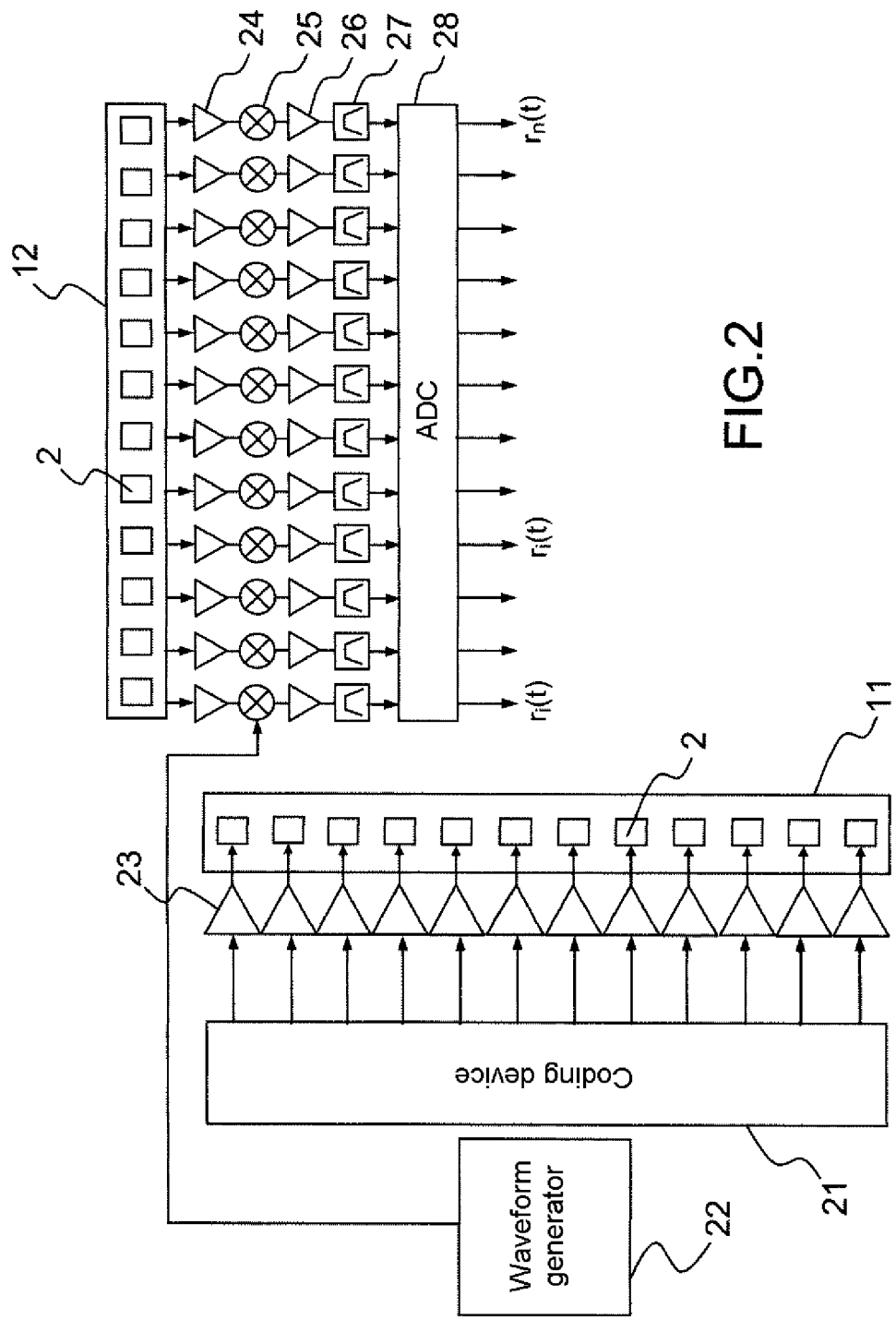
FIG. 2, the principle of construction of a transmission and reception system used in a radar system according to the invention.

The schematic diagram in FIG. 2 shows the principle of construction of a transmission and reception system of a radar system according to the invention, using an array antenna of the type shown in FIG. 1. In the example of FIG. 2, the radar comprises:

an antenna composed of at least one vertical linear array 11 for transmission and of at least one horizontal linear array 12 for reception, orthogonal to the transmission array 11, the transmission antenna allowing the beam to be focussed in the elevation plane whereas the reception antenna focussed the beam in the azimuthal plane;

a frequency coding device 21 allowing a colored emission to be implemented in the elevation plane in order to form a sum beam and a difference beam, according to the known technique of phase monopulse and for reception beam formation by computation (BFC), the resulting antenna transmission and reception radiation patterns notably being optimized in order to cover the field being monitored and to minimize the ground clutter intercepted by the antenna.

The radar therefore comprises a waveform generator 22 which supplies the coding device 21. Starting from the wave supplied by the generator 22, the coding device supplies a frequency coded signal to each elementary source 2 in order to form a colored emission according to a technique known from the prior art. A transmission said to be 'colored' assigns to each direction of the sector being monitored an illumination law specific to it allowing each echo to be characterized according to its origin.

Before being transmitted to the elementary sources 2, the signals coming from the coding device 21 are amplified by the power amplifiers 23.

Upon reception, the signals received by the antenna elements 2 of the receiver array 12 are for example amplified by a low-noise amplifier 24. The reception system comprises as many channels as there are elements 2. The signals thus received on each channel are transposed to an intermediate frequency by means of a mixer 25. A signal received on one channel is thus for example mixed with the frequency supplied by the waveform generator 22. A transposed received elementary signal is subsequently amplified by a low-noise amplifier 26 then filtered by a filter 27 before being digitized by an analogue-digital converter 28. At the output(s) of one or more converters 28, N digitized elementary reception signals $r_1(t), \ldots r_i(t), \ldots r_N(t)$ are obtained, N being the number of antenna elements 2. A reception beam is then formed by computation using these values $r_1(t), \ldots r_i(t), \ldots r_N(t)$.

Figure 3:
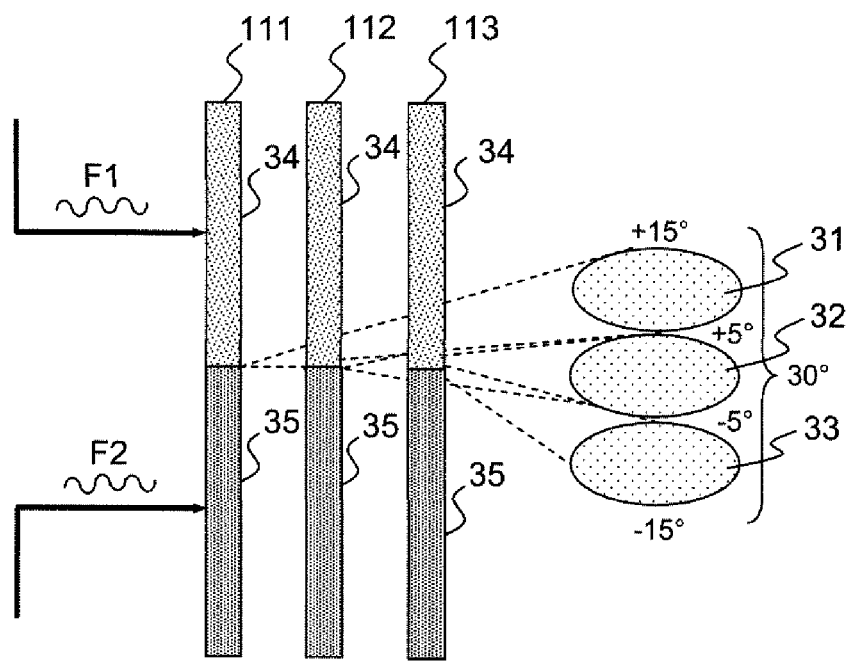
FIG. 3, an exemplary embodiment of a radar system according to the invention.

FIG. 3 illustrates a first exemplary embodiment of a transmission system in a radar system according to the invention based on the principle of construction such as illustrated in FIG. 2. In this example, the range to be covered in the elevation plane is divided into several sub-ranges in which a sum beam and a difference beam are formed for example by colored emission. By way of example, for an elevation range to be covered of 30°, three sub-ranges of 10° are defined, the target axes for these sub-ranges being respectively placed at −10°, 0° and +10° for example.

The exemplary embodiment in FIG. 3 therefore covers an elevation range of 30° combining three sub-ranges 31, 32, 33 of 10° each. Each sub-range is covered by a column antenna 111, 112, 113 of the type of the array antenna 11 illustrated in FIG. 1. The three antennas each exhibit an angular aperture of 10° and are directed relative to one another with a difference of 10°; thus, a first antenna 111 covers an angular sector in elevation in the range between +5° and +15°, a second antenna 112 covers a sector in the range between −5° and +5° and a third antenna 113 covers a sector in the range between −15° and −5°. In other words, each antenna 111, 112, 113 has a transmission beam covering one of the aforementioned sectors, the axes of the beams being angularly displaced from one another.

The sub-ranges can be covered sequentially or simultaneously by, for example, assigning a different frequency range to each angular sector 31, 32, 33.

Coloring of the space is for example achieved in a very simple manner by emitting on the upper half 34 of each antenna a sinusoidal signal with frequency F1 and emitting on the lower half 35 of each antenna a sinusoidal signal with frequency F2, the upper part forming a sub-array and the lower part forming another sub-array, the two frequencies F1 and F2 being orthogonal over the duration of a transmission pulse. Upon reception, the echo signal comprising the two frequency components just needs to be correlated with two sine waves of frequencies F1 and F2, one component corresponding to the signal emitted by the upper part of an antenna and one component corresponding to the signal emitted by the lower part of an antenna. It is then possible to form the two monopulse sum $\Sigma$ and difference $\Delta$ channels in the elevation plane on each of the sources 2 of the reception array. The sum channel $\Sigma$ corresponds to the sum of the signals with frequencies F1 and F2; this is symbolically written $\Sigma$=F1+F2. The difference channel generates the difference between the signals with frequency F1 and the signals with frequency F2; this is symbolically written $\Delta$=F1−F2.

In the case of a pulsed transmission using pulses with duration T, the conditions for orthogonality between the two sine waves with frequency F1 and F2 are met if F1−F2=k/T, where k is a relative non-zero integer.

Figure 4:
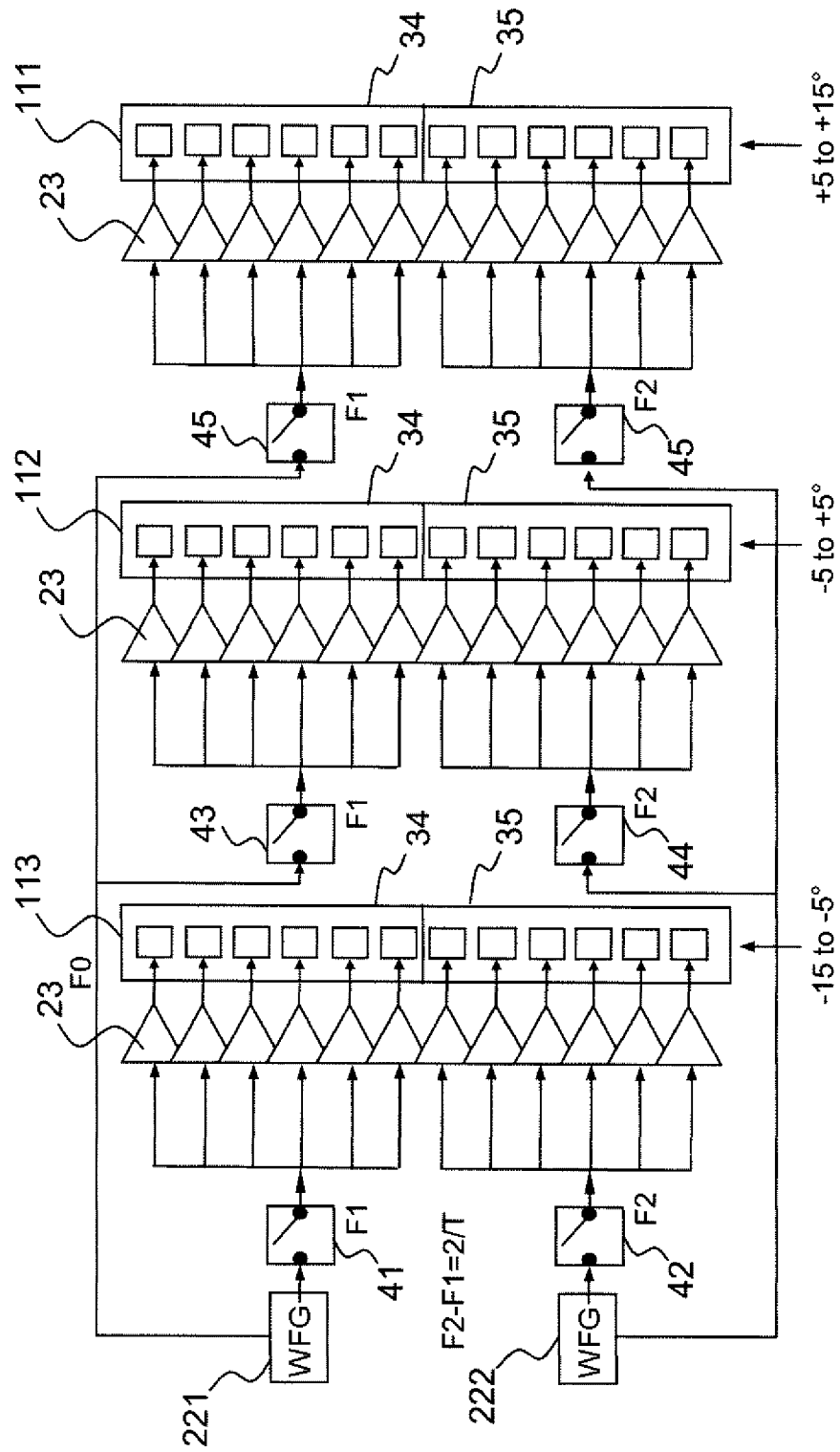
FIG. 4, one possible embodiment of the transmission part for the preceding exemplary embodiment.

FIG. 4 illustrates one possible embodiment of the system shown in FIG. 3. This embodiment uses the architecture of the system shown in FIG. 2. Each source of the array antennas 111, 112, 113 is fed by a power amplifier 23. In this embodiment, the coding device is simplified and is replaced by the generation of two frequencies F1, F2 respectively assigned to the upper and lower parts of the antennas. The waveform generator 22 in FIG. 2 is then replaced by two waveform generators 221, 222 respectively delivering the frequency F1 and the frequency F2. The first generator 221 is fed to the amplifiers 23 for the upper parts of the antennas 111, 112, 113 and the second generator 222 to the amplifiers 23 for the lower parts of the antennas. In this exemplary embodiment, the quantity k hereinabove is equal to 2, in other words F1−F2=2/T.

A switch 41, 42, 43, 44, 45, 46 is for example placed between a generator and the amplifiers that it supplies, allowing sequential or simultaneous transmissions to be carried out in the various sub-ranges 31, 32, 33 covered by the antennas.

Figure 5:
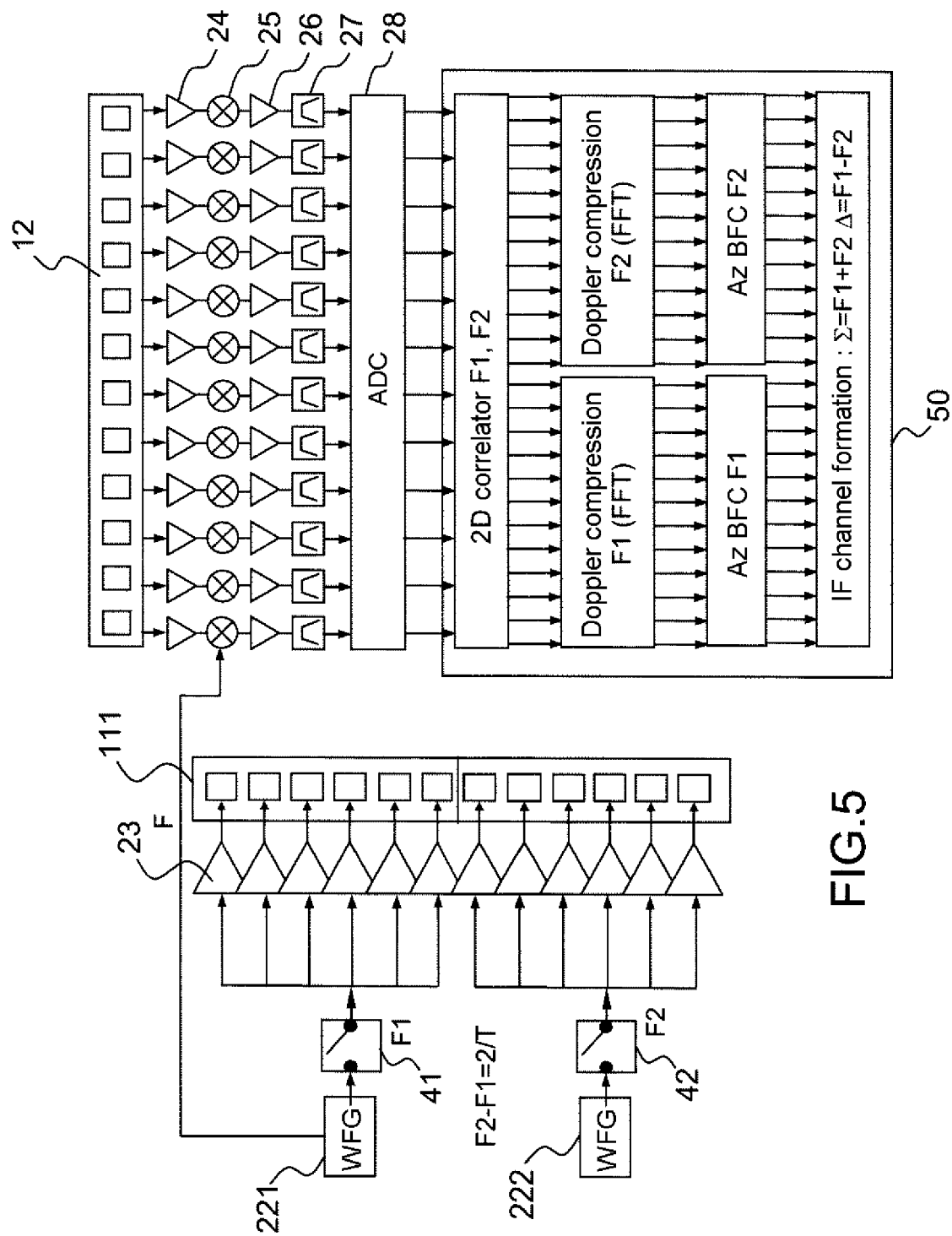
FIG. 5, one possible embodiment of the reception part and processing for the preceding exemplary embodiment.

FIG. 5 illustrates the receiver part, and more particularly the processing, of the system shown in FIGS. 3 and 4, only one transmission array antenna 111 and its supply circuits being shown. The reception circuits 24, 25, 26, 27, 28 together with the reception array antenna 12 are those of the transmission and reception system shown in FIG. 2. The digital signals $r_1(t), \ldots r_i(t), \ldots r_N(t)$ delivered by the analogue-digital converter 28 are processed by processing means 50. Each digital signal $r_i(t)$ comprises a series of samples representing the echo signal received on the corresponding source 2 of order i. This echo signal itself comprises a component at the frequency F1 and a component at the frequency F2.

The processing means 50 perform, in a known manner, a correlation of the digital signal with two digitized sine waves, with frequencies F1 and F2. Then, a Doppler compression is carried out by fast Fourrier transform (FFT) for the signals at the frequency F1 and for the signals at the frequency F2 coming from the correlation step. A beam formation by computation (BFC) is carried out on the signals at F1 and on the signals at F2 in order to obtain reception signals in the azimuthal plane. The signals at F1 and at F2 are furthermore used in order to form the sum and difference channels. The FFT, BFC together with the sums and differences are performed for each signal $r_i(t)$.

In one variant embodiment, the division of the transmission range into several beams may be carried out by means of a single array of phase-shifters, the beam being aimed electronically and sequentially in the directions corresponding to the various angular sectors 31, 32, 33 to be covered. The phase-shifters apply a fixed phase shift value, the various directionalities being obtained by switching of microwave lines by means of PIN diodes for example. The reception processing remains unchanged and remains in accordance with the diagram in FIG. 5. In particular, the formation of the sum and delta channels then remains unchanged.

In this embodiment, only one array antenna is used instead of three. The transmission array is for example fabricated using multilayer microwave technology, one face of the printed circuit being used for the radiating elements 2 and the opposite face being used for mounting the active microwave elements, notably the power amplifiers and the PIN diodes, the internal layers of the printed circuit being used for the various distribution and phase-shifting lines. The reception array uses for example the same type of technology. This technology is furthermore applicable to other embodiments, notably the embodiment described by FIG. 4.

Figure 6:
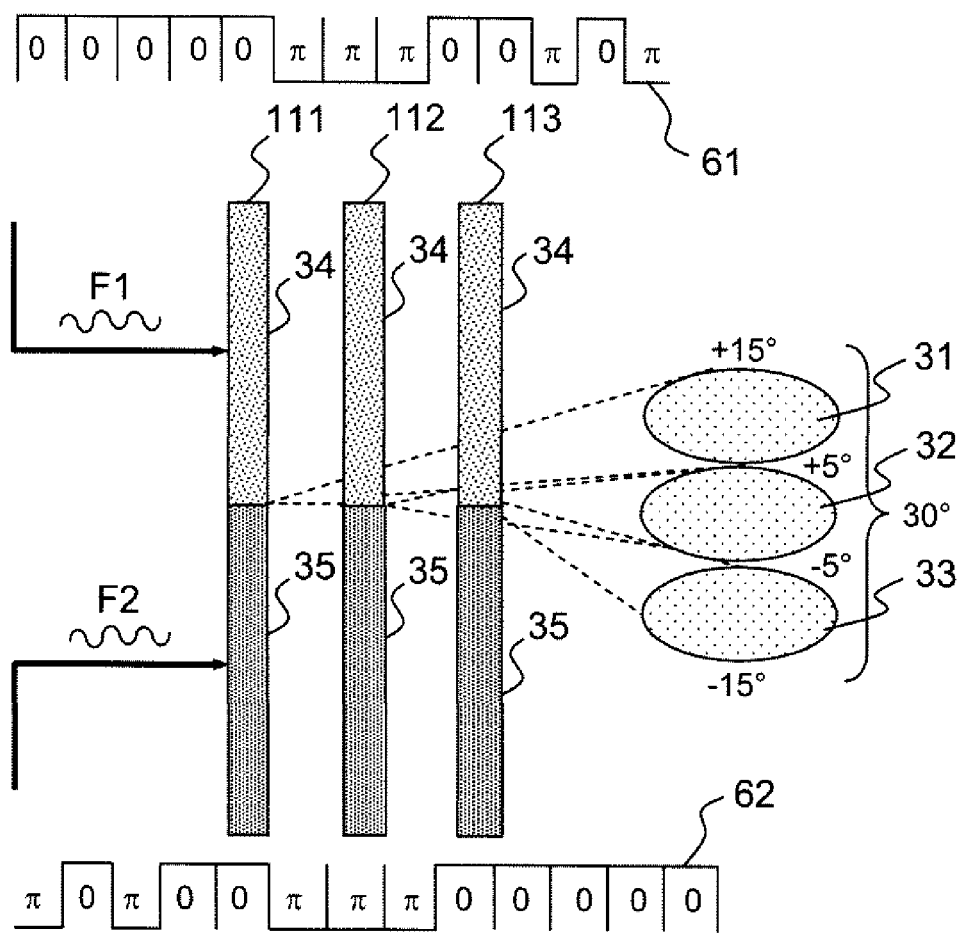
FIG. 6, another exemplary embodiment of a radar system according to the invention.

FIG. 6 illustrates another possible mode of operation of a radar system according to the invention which uses three antennas 111, 112, 113 of the type in FIG. 3 each covering an angular sub-sector 31, 32, 33, the whole assembly covering for example a sector of approximately 30°. In this solution, the coloring mode for the transmission is different. The colored emission is no longer obtained by a frequency code but is achieved by means of a Barker code. More precisely, a direct Barker code 61 is applied to the signals emitted by each upper half-antenna 34 and the same inverted, or reversed, code is applied to the signals emitted by each lower half-antenna 35; this is the case for the three antennas used 111, 112, 113.

The reception processing remains unchanged, the reception correlation simply being adapted to the Barker code. The coloring by Barker code can also be used in one variant embodiment using an array of phase-shifters to generate the various transmission sub-beams.

A radar system according to the invention notably presents the following advantages:
- minimization of the number of transmission and reception channels; in order to form beams having an aperture of around 8 to 10° in both planes, the number of channels is typically around 8 to 12 for the transmission array and for the reception array;
- re-arrangement possible of transmission channels into two sub-arrays, simplification of the electronic circuits and associated processing, and limitation of the number of components;
- facilitates integration onto the carrier: the transmission and reception antennas are of linear shapes, the surface area of the radiating panel is minimized, furthermore, the two array antennas may be physically separated and each of these antennas can have a length of around 20 to 25 cm for a radar system operating in X band;
- improved performance characteristics for the detection of low-speed targets, in contrast against ground clutter, since the resulting antenna transmission/reception radiation pattern is optimized, and thanks to the reception beam formation by computation, the targeting of the beam is accurate, since the level of the secondary lobes may be controlled by weighting on reception, the radiation pattern is not altered by the effects of phase quantization, and monopulse processing operations are accessible;
- compatibility with a high resolution in distance, in the case of a coloring in frequency;
- compatibility with a high resolution in Doppler mode, the transmission being carried out in wide field and allowing simultaneous monitoring over the whole area, which maximizes the observation time on the targets for a given observation cycle time;
- simplified implementation, since the colored emission can be implemented without variable-step microwave phase-shifters, in contrast to the conventional solutions;
- absence of phase quantization effects, since the reception beam formation is carried out digitally in both planes;
- compatibility with a continuous waveform;
- compatibility with the use of low-cost microwave amplifiers in the 2 watt class, available off-the-shelf; based on a transmission over 12 sources, the transmitted power can, in this case, reach an average level of 24 watts, which is sufficient for the resulting range required by the 'sense and avoid' function, which is typically 6 Nm over 1 $m^2$ RCS.

The invention claimed is:

1. A radar device comprising:
an antenna including at least two linear arrays of radiating elements being orthogonal to one another, wherein the at least two linear arrays of radiating elements include a first linear array of radiating element being used to focus a transmission beam in a first plane and a second linear array of radiating element being used to focus a reception beam in a second plane that is orthogonal to the first plane, wherein the focussing of the transmission beam being obtained in the first plane by colored emission followed by the reception beam formation by computation, and the focussing of the reception beam being obtained in the second plane using the reception beam formation by computation, the colored emission being carried out by combining antenna transmission sub-arrays in such a manner as to form a sum channel and a difference channel on reception array according to monopulse technique.

2. The radar device according to claim 1, wherein the first plane is an elevation plane and the second plane is an azimuthal plane.

3. The radar device according to claim 1, wherein the first linear array of radiating elements being substantially vertical, a first sub-array is formed from an upper part of the first linear array of radiating elements and a second sub-array is formed from a lower part of the first linear array of radiating elements.

4. The radar device according to claim 3, wherein the colored emission is carried out by means of a direct Barker code.

5. The radar device according to claim 4, wherein the direct Barker code is emitted on the first sub-array and an inverted direct Barker code is emitted on the second sub-array.

6. The radar device according to claim 3, wherein the colored emission is carried out by means of a frequency code.

7. The radar device according to claim 6, wherein the frequency coding comprises in emitting the transmission beam at a given frequency on the first sub-array and in emitting the transmission beam at a different frequency, these two frequencies being orthogonal over the duration of a transmission pulse.

8. The radar device according to claim 1, further comprising at least one additional linear array of radiating elements for focussing a transmission beam substantially parallel to the first linear array of radiating elements, the various transmission beams having different directions, each beam being dedicated to one part of an angular range to be covered.

9. The radar device according to claim 1, wherein the second linear array of radiating elements comprises at least two lines of radiating elements forming an interferometer being ambiguous in elevation, wherein the ambiguity being removed by focussing the reception beam in a direction targeted.

10. The radar device according to claim 1, wherein the focussing is obtained in one plane by electronic scanning on transmission and in the other plane using beam formation by computation on reception.

11. The radar device according to claim 1, wherein the transmission part and the reception part are constructed as a multilayer printed circuit, the radiating elements being etched onto one of a plurality of faces of the multilayer printed circuit, active components being mounted onto other face of the multilayer printed circuit, interconnection and distribution elements being formed on internal layers of the multilayer printed circuit.

12. The radar device according to claim 1, wherein the radar device equips an aircraft for an obstacle detection and avoidance function.

* * * * *